Figure 1:
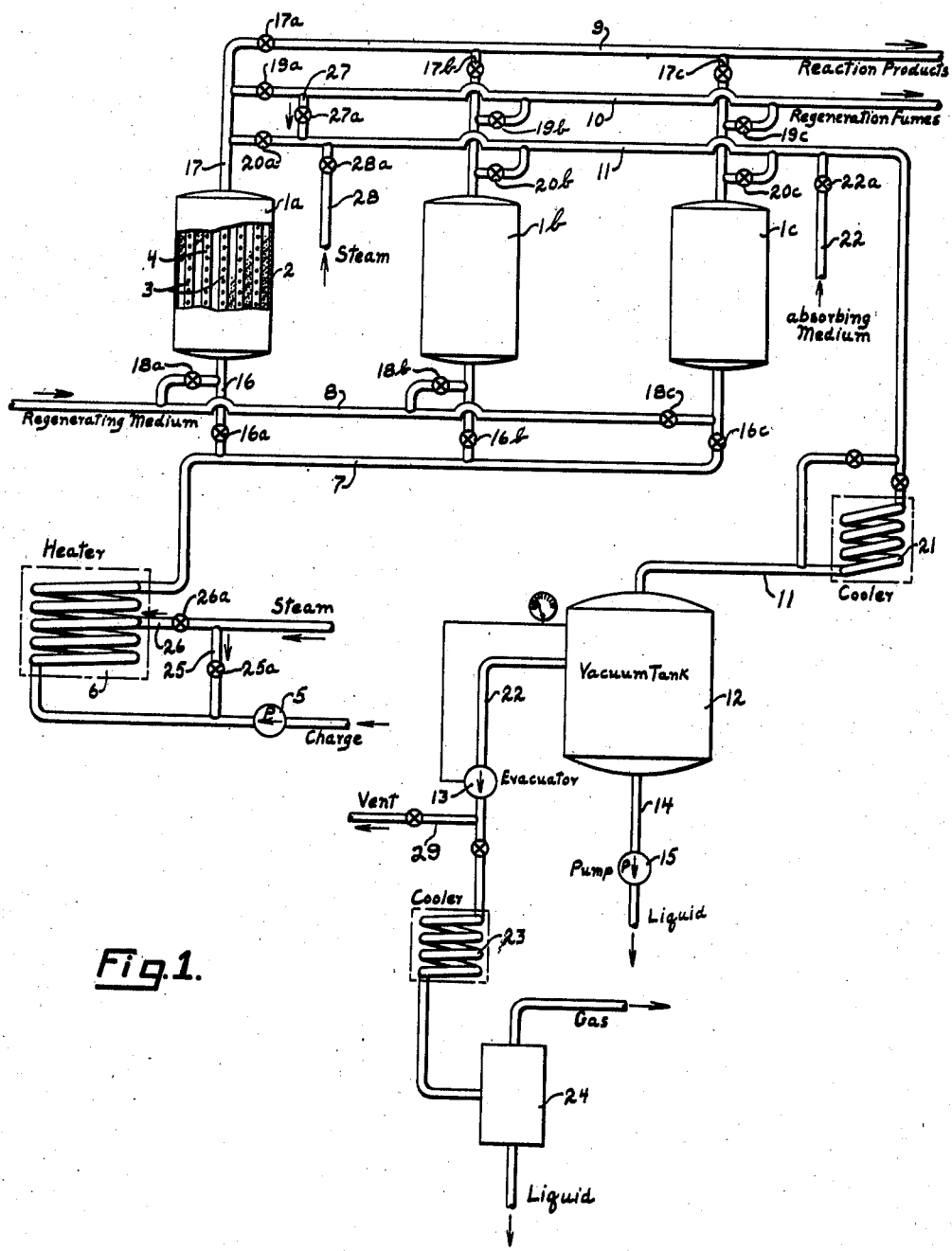

Oct. 12, 1937. A. E. PEW, JR 2,095,264
TREATMENT OF FLUIDS BY CONTACT MASSES
Filed April 8, 1936 2 Sheets-Sheet 1

INVENTOR
ARTHUR E. PEW JR.
BY
ATTORNEY

Patented Oct. 12, 1937

2,095,264

UNITED STATES PATENT OFFICE 2,095,264

TREATMENT OF FLUIDS BY CONTACT MASSES

Arthur E. Pew, Jr., Bryn Mawr, Pa., assignor, by mesne assignments, to Houdry Process Corporation, Wilmington, Del., a corporation of Delaware Application April 8, 1936, Serial No. 73,223

8 Claims. (Cl. 196—52)

This invention relates to the art of treating fluids, especially when the treating is effected by or in the presence of a contact mass, as in separation of gases by adsorption, chemical reactions involving decomposition, synthesis, metathesis or combinations of such operations, and the like. More particularly the invention has to do with the extraction of gaseous and liquid material from a treating or reaction chamber containing a contact or catalytic mass, and hence may be considered in certain respects as an improvement upon or further development of the invention disclosed in the copending application of John Howard Pew, Serial No. 23,533, filed May 27, 1935.

Purging of a reaction chamber or contact mass is normally effected after an operative run as complete or partial preparation for a repetition of the same operation or for a different operation. Its purpose is to prevent waste or loss of charging material or products, to segregate different fluids and to prevent their intermixture, so as to avoid danger of explosions, the formation or escape of toxic or otherwise objectionable fluids, and for other economic or practical reasons.

One object of the invention is to effect a purging operation in a thorough, economical, and expeditious manner without the use of extraneous fluids. Another object is to purge by applying a high vacuum instantaneously and preferably uniformly, and to maintain the vacuum as long as required. Another object is to devise suitable and improved apparatus for such an operation. Still other objects will be apparent from the detailed description which follows.

When a contact mass contains fluid in liquid phase and the same is subjected to evacuation, there is a tendency for the liquid to remain adsorbed by the catalytic mass and to vaporize or distill off relatively slowly and at times to produce or increase deposits on the mass resulting from the reaction. This is particularly so with commercial converters containing large masses of contact material, especially when an appreciable period is required for the vacuum to build up or to ..ecome effective throughout the mass. The present invention utilizes a chamber or tank of adequate size which is continuously under a high vacuum. By suitable outlets distributed throughout the contact mass and with a rapid manipulation of valves this high vacuum is instantly made available and effective at a multiplicity of points, throughout the entire mass. This produces an immediate and complete removal of substantially all fluids, both gaseous and liquid capable of existing as vapor at the conditions of temperature and degree of pressure or vacuum employed, and entirely avoids or greatly minimizes undesirable side reactions or other changes which frequently take place when fluids remain too long adsorbed in or otherwise mechanically retained by a contact mass. The rapid application of the vacuum also effects removal from the mass, by entrainment in the rapidly expanding fluid leaving the same, of unvaporized liquid. The vacuum tank or chamber is arranged to be connected in circuit between the converter or reaction chamber to be purged and the suction pump or other type of evacuator. The extracted vapors may be reduced in volume before they reach the vacuum tank by passing them through a heat exchanger or by quenching them with a suitable cooling fluid. Suitable provision is made for withdrawing gases and liquid from the vacuum tank for the recovery of valuable material, and also, for sweeping out the evacuation lines and equipment in the instances where dissimilar fluids are to be purged at different times from the same converter or from different converters. One or more vacuum chambers may be used as required.

Figure 2:
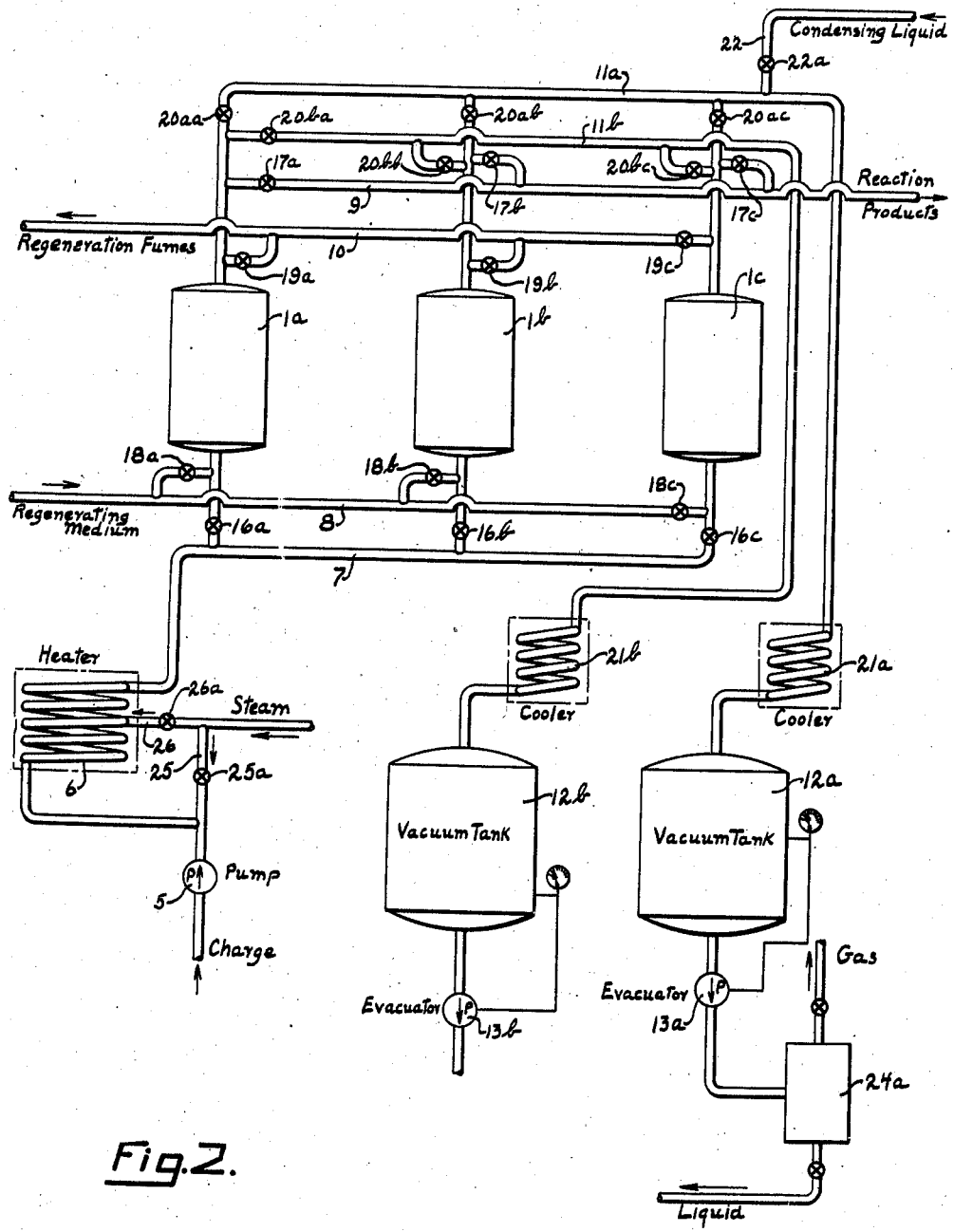

In order to illustrate this invention, concrete embodiments thereof are shown in the accompanying drawings in which:

Fig. 1 is a diagrammatic lay-out of a battery of treating chambers or converters arranged for dissimilar alternate operations, e. g., an on-stream or reaction step followed by a different reaction or regeneration step, together with apparatus to effect the desired purging intermediate such dissimilar steps; and Fig. 2 is a modification of the apparatus shown in Fig. 1, two vacuum tanks being employed in place of one.

Referring more in detail to the drawings, in the figures of which like reference characters denote similar parts, 1a, 1b, and 1c are converters or the like, each containing a bed of contact material or catalyst 2, which is preferably in molded or fragmentary form. Two groups or series of perforated conduits may be embedded in uniform symmetrical arrangement in the contact mass 2, conduits 3 serving to distribute fluid reactants or regenerating media throughout the mass and conduits 4 to collect and remove fluid products of reaction or regeneration, as the case may be, as indicated in the copending application of E. J. Houdry, Serial No. 611,362, filed May 14, 1932 which issued June 2, 1936 as Patent No. 2,042,468. While three converters are shown in the drawings, any number of converters are contemplated but the number shown is sufficient to illustrate that one converter may be employed for one type of treatment, for example it may be on-stream, while another is employed for a different operation such as undergoing regeneration, and the third is being purged intermediate a regeneration and on-stream step.

While the invention is applicable to a great variety of operations, for the sake of furnishing a specific illustration, we may consider the treatment or conversion of a petroleum fraction or derivative, where periods of regeneration alternate with on-stream periods of treatment or conversion, as exemplary of the general application of my invention.

The reactant material or petroleum fraction may be forced by pump 5 through heater 6 and thence into manifolding line 7 from which it may be passed through the valved connections shown to any one or more of the converters 1a, 1b, and 1c, as desired. A gaseous fluid such as steam, fixed gas, hydrogen, etc. may be introduced with the charge of reactants prior to the passage of the same through the heater 6 by introduction through the branch line 25, controlled by valve 25a, or during passage of the charge through the heater 6 by introduction through the branch line 26, controlled by valve 26a. Regenerating medium, such, for example as air or other oxygen-containing gas, may be introduced into manifold 8 from which, by proper adjustment of the valves shown, it may be passed into any one or more of the converters as desired. Products of reaction may be withdrawn from the converter or converters on-stream through the valved lines shown which are joined to the manifold line 9, and fumes or products of regeneration may be drawn from the converter or converters in regeneration by control of the valves in the respective line or lines leading to manifold 10. Manifold 11 is connected to a tank or vacuum accumulator 12, which is kept under the desired degree of vacuum by a suitable evacuator 13 which is preferably automatically controlled. Accumulator tank 12 is kept free, or substantially free, of liquid by drain duct 14 leading therefrom having pump 15 therein. Any one or more of the converters may be put under vacuum by control of the valves in the lines which provide communication between the converters and the manifold 11.

Let us imagine that converter 1a is on-stream, converter 1b is in regeneration and that converter 1c is being purged preliminary to regeneration, assuming that converter 1c has just been on-stream. Reactant fluid, usually in vapor form, will pass from the heater 6 into manifold line 7 and, with valve 16a open, will pass through branch line 16 into the converter 1a, to be distributed throughout the bed or mass by perforated conduits 3. Products of reaction will be withdrawn through line 17 and will enter the outlet manifold for reaction products through valve 17a. During this operation, valves 18a, 19a, and 20a will be closed. At the same time, valves 18b and 19b will be open to permit the regeneration of the mass in converter 1b, valves 16b, 17b, and 20b being in closed position. At the same time converter 1c is being purged following an on-stream period of operation. Valves 16c and 18c will both be closed, as well as valves 17c and 19c and valve 20c will be open. Due to the substantially instantaneous application of a high vacuum throughout converter 1c when valve 20c is opened, all hydrocarbon fluids which remained in the contact mass and in adjoining manifolds and passages will be withdrawn through valve 20c into manifold 11 and from there will pass through the cooler 21 into the vacuum tank 12. When the hydrocarbon fluid being evacuated is of a rather low boiling point, for example composed to substantial extent of materials in the gasoline boiling range, a fluid such as a higher boiling petroleum fraction at a relatively low temperature, e. g., a gas oil or heavier fraction, may be introduced with the products of evacuation through line 22, controlled by valve 22a, and will serve to further assist in liquefying and reducing the volume of fluid entering the vacuum tank 12. When such a cooling or absorbing medium is employed, cooler 21 may be by-passed through the valved line shown, if desired. Liquid entering the vacuum tank 12 falls to the bottom of the tank and is continuously or periodically withdrawn through duct 14 by pump 15. Gases or vapors are withdrawn from the tank 12 through line 22 by evacuator 13 and, where the gases comprise valuable hydrocarbons, they are ordinarily sent through the cooler 23 into the liquid-gas separator 24, which latter may be at approximately atmospheric pressure, for example. However, in the alternating evacuation of regeneration gases, they may be discharged from the system through valve controlled vent 29, following evacuator 13, rather than to pass into separator 24. At the pressure in the separator 24, which is ordinarily very substantially higher than that in vacuum tank 12, a considerable amount of the products of evacuation will appear as a condensate and can be recovered as liquid. The uncondensed or gaseous material can be led from the separator 24 and be employed as fuel, passed to storage or further treated or otherwise utilized, as desired.

The purging or evacuation of each converter is accomplished rapidly and thoroughly with a relatively small pump or evacuator, indicated at 13 which is kept running constantly so as to keep tank 12 under a high vacuum. Complete evacuation of a converter is effected in a very short time and without any substantial change in the pressure within tank 12. This results from a number of factors, such as cooling the fluids to reduce their volume, providing a vacuum accumulator of greater size or free space as compared with the reaction chamber to be purged, and operating this evacuator continuously or otherwise so that the fluids are withdrawn from the accumulator as fast as they enter it.

The period required for purging a reaction chamber is normally quite short and very much less than the length of the on-stream period or the length of the period of regeneration. A good operation is to make the aggregate time required for purging and regeneration twice the length of the on-stream period. Then the cycle of operation balances out with 3 converters in the battery. However, the invention is not limited to any particular periods for on-stream operation, for regeneration or for purging; nor is it limited to any particular number of converters.

Where the evacuation apparatus is used at one time for withdrawing hydrocarbon fluids from a converter, and at another time for withdrawing products of regeneration which may have a high oxygen-content from another converter, it often becomes desirable if not necessary, to purge the evacuation apparatus itself to prevent undesirable combustion or explosion within the lines or vacuum tank thereof. This may be done, for example, by opening the valve 27a in connection 27 between lines 10 and 11 so as to draw a slug of high-carbon dioxide content gas or relatively inert regeneration fumes therethrough to purge vacuum tank 12 and associated lines either of oxygen-containing gases or hydrocarbon vapors, as the case may be. In the event that the operation is such that this type of purging or evacuation equipment is not certain to insure freedom from explosion or combustion, steam or other relatively inert gas from an outside source may be drawn through the evacuation apparatus as by opening valve 28a in steam line 28, thereby to draw enough steam through the evacuation lines and tank to dilute the gas therein or purge it therefrom.

When the end of the on-stream period for converter 1a is reached, the regeneration of mass in converter 1b may be assumed to have been completed and the converter properly purged of oxygen-containing gases and ready to go onstream the instant converter 1a is taken off stream. At the same time converter 1c may be undergoing regeneration and the regeneration thereof may continue without interruption. The description of the operation when converter 1b, or converter 1c, is on-stream and the other or remaining converters are undergoing purging and/or regeneration, will be obvious in view of the description above given.

The operation of apparatus shown in Fig. 2 will be generally understood from the description given of the apparatus of Fig. 1, with slight exceptions. In Fig. 2 vacuum tank 12a is employed only for the evacuation of the converters after the first or "on-stream" reaction, as for the removal of hydrocarbon vapors, while vacuum tank 12b is employed only for evacuation following the second or regenerating reaction, as for the removal of oxygen-containing gases prior to putting the converter back on-stream. With this arrangement of apparatus, no sweeping out or purging of the evacuation lines or chambers is necessary between successive purging or evacuation operations in view of the fact that the same type of gases are always being drawn into each particular vacuum tank, thus creating no danger of combustion or explosion in the evacuation equipment. This arrangement of apparatus also simplifies the removal of fluids from each vacuum tank in that a particular vacuum tank does not have to be arranged to provide for the elimination of different types of fluids such as regeneration fumes and hydrocarbon liquids and/or vapors. The gas drawn from vacuum tank 12b by evacuator 13b, in the type of illustration here employed may consist of flue gases having a large content of carbon dioxide, nitrogen and certain amounts of oxygen, for example. This may be discharged to the atmosphere or may be recirculated in controlled amounts back to manifold line 8 to control the oxidizing potential of the regeneration medium introduced to the converter under regeneration. On the other hand, all of the fluid which enters vacuum tank 12a normally comprises valuable hydrocarbons which at atmospheric pressure may be composed partly of liquids and partly of gases. These may be separated from each other in separator 24a and the gas and liquid separately conducted to any desired equipment or storage.

Under certain conditions it is possible to operate with only one accumulator tank (as shown in Fig. 1) to which but one reactant is passed although different fluids in alternate or other sequence are sent to the converters to produce different reactions. One way is to suppress one of the purging operations. In the treatment or conversion of hydrocarbons with periods of regeneration alternating with the on-stream periods, it is necessary to effect purging of each converter before regeneration by oxidation or burning of contaminating deposits in the contact mass (and the single vacuum accumulator is used for this purpose) but evacuation at the end of regeneration may be omitted. This is accomplished by closing all valves and letting the converter stand under pressure for a few minutes. The oxygen in the regenerating fluid then trapped in the converter has time to combine with the traces of carbon still remaining in the contact mass until all danger of explosion is passed. The pressure in the converter is then released to atmosphere by a suitable vent (not shown) and the converter is immediately put "on-stream". This method of operation has the disadvantage of loading up the subsequent condensing and/or treating equipment for a short time with an excess of fixed gas but on the other hand it simplifies the evacuating apparatus and its use to a substantial extent. Instead of venting the trapped fluid to atmosphere, this inert gas under pressure may be utilized wherever an extraneous purging agent is required, as to sweep out lines, or even to purge an adjacent converter, by discharging it directly into and through the same.

While the invention has been described and illustrated more particularly with relation to the treatment or conversion of hydrocarbons using a contact mass alternately on-stream and in regeneration it is to be understood that the invention is broadly applicable to treating operations or other processes requiring a purging step, regardless of what particular fluid is being subjected to treatment, separation, conversion, etc. and regardless of the particular dissimilar or alternate fluid or regenerating medium passed through the reaction zone, so long as the condition exists where it is necessary or desirable to effect a separation or to prevent intermixture of one fluid such as a reactant fluid with another fluid such as a regenerating medium within the converters or lines joined thereto. It may even be employed when there is no contact material in the reaction chamber. It is intended that all modifications, variations, combinations and equivalents within the scope of the invention be covered by the appended claims.

What I claim is:

1. In the treatment or conversion of fluids wherein a contact mass disposed within a reaction zone is utilized in an operating cycle involving successive steps of feeding a stream of fluid starting material to said mass for an on-stream or reaction period and thereafter purging said mass of adsorbed fluid, the process of establishing a zone providing a chamber of substantially greater volume than the free volume in said reaction zone, during the on-stream period of said reaction zone drawing a substantial vacuum on said chamber, after said on-stream period connecting said chamber in fluid communicating relation with said reaction zone suddenly to apply said vacuum to the latter to effect purging of fluids therefrom, disconnecting said chamber from said reaction zone, and, thereafter, when fluid is again being fed to said reaction zone, drawing a substantial vacuum on said chamber preparatory to the next purging of said reaction zone.

2. In the treatment or conversion of fluids wherein a contact mass disposed within a reaction zone is utilized in an operating cycle involving successive steps of feeding a stream of fluid starting material to said mass for an on-stream or reaction period and thereafter purging said mass of adsorbed fluid, the process of establishing a zone providing a chamber of substantially greater volume than the free volume in said reaction zone, during the on-stream period of said reaction zone drawing a substantial vacuum on said chamber, after said on-stream period connecting said chamber in fluid communicating relation with said reaction zone suddenly to apply said vacuum to the latter to effect purging of fluids therefrom, applying said vacuum substantially instantaneously and simultaneously to said contact mass at a multiplicity of points throughout the same, disconnecting said chamber and said reaction zone, removing purged fluid from said chamber, and, when fluid is again being fed to said reaction zone, drawing a substantial vacuum on said chamber preparatory to the next purging of said reaction zone.

3. In the treatment or conversion of fluids wherein a contact mass disposed within a reaction zone is utilized in an operating cycle involving alternately feeding fluid starting material for an on-stream period and fluid regenerating medium for a regeneration period, the process of purging said mass of fluids between said operating periods to minimize intermixture of starting material and products therefrom with fresh and spent regenerating medium comprising establishing a zone providing a chamber of substantially greater volume than the free space in said reaction zone, during said on-stream and regeneration periods drawing a substantial vacuum on said chamber, between said periods connecting said zones in fluid communicating relation suddenly to apply said vacuum to said contact mass to effect purging of fluids therefrom, disconnecting said zones prior to admission of fluid to said reaction zone, and removing purged fluid from said chamber when fluid is being fed to said reaction zone.

4. In the treatment or conversion of fluids wherein a contact mass disposed within a reaction zone is utilized in an operating cycle involving alternately feeding fluid starting material for an on-stream period and fluid regenerating medium for a regeneration period, the process of purging said mass of fluids between said operating periods to minimize intermixture of starting material and products therefrom with fresh and spent regenerating medium comprising establishing two zones each providing a chamber of substantially greater volume than the free space in said reaction zone, during said on-stream periods drawing a substantial vacuum in the chamber of one of said zones, after said on-stream periods connecting said chamber in fluid communicating relation with said reaction zone suddenly to apply said vacuum to said reaction zone to purge the same of fluid starting material and treated fluid, disconnecting said chamber and said reaction zone, during said regeneration periods drawing a substantial vacuum on the other of said chambers, after said regeneration periods connecting said second named chamber and said reaction zone in fluid communicating relation suddenly to apply said vacuum to said contact mass to purge the same of fresh and spent regenerating medium, disconnecting said second named chamber and said reaction zone, and repeating the above steps.

5. In the treatment or conversion of fluid hydrocarbons involving the use of a contact mass disposed in a reaction zone alternately on stream and in regeneration in place by combustion of deposits accumulated during the on-stream period, the process of purging said mass of fluid between on-stream and regeneration periods to minimize intermixture of hydrocarbons and regenerating medium in said reaction zone comprising establishing a zone providing a chamber of substantially greater volume than the free space in said reaction zone, during said on stream and regeneration periods drawing a substantial vacuum on said chamber, between alternate periods connecting said chamber and said reaction zone in fluid communicating relation suddenly to apply said vacuum to the latter, disconnecting said chamber and said reaction zone and removing purged fluid from said chamber prior to drawing vacuum thereon.

6. In the treatment or conversion of hydrocarbons involving the use of a contact mass capable of use alternately on-stream in treating or converting hydrocarbons and in regeneration in place by combustion of deposits accumulated thereon during the on-stream period, said mass being disposed in a battery of converters arranged for alternate on-stream and regeneration periods and adapted to be used in sequence so that at all times at least one converter is on stream, the process of purging said converters and contact mass of fluid intermediate the on-stream and regenerating periods comprising establishing a zone providing a chamber of substantially greater volume than the free space in any of said converters, drawing a substantial vacuum on said chamber, connecting said chamber in fluid communicating relation sequentially with each of said converters between the alternating operations of the latter so as suddenly to apply said vacuum to said mass to effect the desired purging, breaking said fluid communication, and, after each purging step removing purged fluid from said chamber, drawing inert fluid through said chamber to provide an inert atmosphere, and drawing vacuum on said chamber preparatory to the next purging step.

7. In apparatus for the treatment or conversion of fluids, in combination, a plurality of converters, each providing a chamber containing a contact mass, said converters being adapted for use alternately on-stream and in regeneration of said mass in place, separate manifolding means for fluids to be treated, fluid products of reaction, fluid regenerating medium and spent regenerating medium, respectively, valved branches selectively connecting each of said manifolding means with each of said converters, a tank providing a chamber of substantially greater volume than the free space in any of said converters, means for drawing a substantial vacuum on said tank, a vacuum manifold having valved branches therefrom selectively connecting said tank and said converters, cooling means associated with said vacuum manifold for effecting reduction in the volume of purged fluid passing therethrough, a valved connection in said vacuum manifold for the periodic introduction thereinto of inert fluid, and means for withdrawing purged fluid from said tank.

8. In apparatus for the treatment or conversion of fluids, in combination, a plurality of converters, each providing a chamber containing a contact mass, said converters being adapted for use alternately on stream and in regeneration of said mass in place, separate manifolding means for fluids to be treated, fluid products of reaction, fluid regenerating medium and spent regenerating medium, respectively, valved branches selectively connecting each of said manifolding means with each of said converters, a plurality of tanks, each one providing a chamber of substantially greater volume than the free space in any of said converters, means for drawing a substantial vacuum on each tank, separate vacuum manifolds having valved branches therefrom selectively connecting each tank with each of said converters for the quick application of vacuum to said converters thereby to effect purging of fluid therefrom, and means for withdrawing purged fluid from each tank.

ARTHUR E. PEW, Jr.